(12) United States Patent
Gospodinova et al.

(10) Patent No.: US 12,729,408 B2
(45) **Date of Patent: *Sep. 8, 2026**

(54) METHOD FOR PRODUCING A HIGH STRENGTH COATED STEEL SHEET HAVING IMPROVED DUCTILITY AND FORMABILITY, AND OBTAINED COATED STEEL SHEET

(71) Applicant: ArcelorMittal, Luxembourg (LU)

(72) Inventors: Maya Gospodinova, Maizieres-les-Metz (FR); Véronique Hebert, Saint-Julien-les-Metz (FR)

(73) Assignee: ArcelorMittal, Luxembourg (LU)

(*) Notice: Subject to any disclaimer, the term of this patent is extended or adjusted under 35 U.S.C. 154(b) by 192 days.

This patent is subject to a terminal disclaimer.

(21) Appl. No.: 18/108,533

(22) Filed: Feb. 10, 2023

(65) Prior Publication Data

US 2023/0193412 A1 Jun. 22, 2023

Related U.S. Application Data

(63) Continuation of application No. 16/063,740, filed as application No. PCT/EP2016/082195 on Dec. 21, 2016.

(30) Foreign Application Priority Data

Dec. 21, 2015 (WO) .................. PCT/IB2015/059840

(51) Int. Cl.

*C21D 8/02* (2026.01)
*B23K 11/11* (2006.01)

(Continued)

(52) U.S. Cl.

CPC ............ *C21D 8/0236* (2013.01); *B23K 11/11* (2013.01); *B23K 35/3073* (2013.01); *C21D 8/02* (2013.01);

(Continued)

(58) Field of Classification Search

CPC .......... C21D 1/19; C21D 1/25; C21D 8/0226; C21D 8/0236; C21D 8/0247;

(Continued)

(56) References Cited

U.S. PATENT DOCUMENTS 2,664,369 A 12/1953 Kiefer
6,306,527 B1 * 10/2001 Ikeda ........................ C23C 2/40 148/533

(Continued)

FOREIGN PATENT DOCUMENTS

CN 103620063 A 3/2014
EP 1865085 A1 12/2007

(Continued)

OTHER PUBLICATIONS

"Continuous Hot Dip Coatings". 1994. ASM Handbooks. vol. 5. p. 339-348. (Year: 1994).*

(Continued)

*Primary Examiner* — Nicholas A Wang
(74) *Attorney, Agent, or Firm* — Davidson Kappel LLC

(57) ABSTRACT

A method for producing a coated steel sheet having a tensile strength TS of at least 1100 MPa, a total elongation TE according to ISO standard 6892-1 of at least 12%, the product TS×TE of the tensile strength by the total elongation being at least 14200 MPa %, and a hole expansion ratio HER according to ISO standard 16630:2009 of at least 25%, the method including the following successive steps:

providing a cold-rolled steel sheet, the chemical composition of the steel containing in weight %: $0.15\% \le C \le 0.23\%$, $2.0\% \le Mn \le 2.7\%$, with $C+Mn/10 \ge 0.420\%$, $0 \le Cr \le 0.40\%$, with $Mn+Cr \ge 2.25\%$, $0.2\% \le Si \le 1.6\%$, $0.02\% \le Al \le 1.2\%$, with $1.0\% \le Si+Al \le 2.2\%$, $0 \le Nb \le 0.035\% \le Mo \le 0.1\%$, the remainder being Fe and unavoidable impurities, (Continued)

annealing the steel sheet at an annealing temperature $T_A$ so as to obtain a structure comprising at least 65% of austenite and at most 35% of intercritical ferrite, quenching the sheet from a temperature of at least 600° C. at a cooling rate comprised between 20° C./s and 50° C./s down to a quenching temperature QT between 200° C. and 270° C., heating the sheet up to a partitioning temperature PT comprised between 400° C. and 480° C. and maintaining the sheet at this partitioning temperature PT for a partitioning time Pt comprised between 50 s and 250 s, hot-dip coating the sheet at a temperature less than 515° C., cooling the coated sheet down to the room temperature, the steel sheet having a microstructure consisting of, in surface fraction: between 3% and 15% of retained austenite, at least 30% of tempered martensite, at most 5% of fresh martensite, at most 35% of bainite, the sum of the surface fractions of tempered martensite, fresh martensite and bainite being comprised between 55% and 92%, and between 5% and 35% of ferrite.

21 Claims, 1 Drawing Sheet

(51) Int. Cl.

| | |
|---|---|
| ***B23K 35/30*** | (2006.01) |
| ***C21D 8/0221*** | (2026.01) |
| ***C21D 8/0247*** | (2026.01) |
| ***C22C 38/04*** | (2006.01) |
| ***C22C 38/22*** | (2006.01) |
| ***C22C 38/26*** | (2006.01) |
| ***C22C 38/34*** | (2006.01) |
| ***C23C 2/02*** | (2006.01) |
| ***C23C 2/06*** | (2006.01) |
| ***C23C 2/28*** | (2006.01) |
| ***C23C 2/40*** | (2006.01) |
| *B23K 103/04* | (2006.01) |

(52) U.S. Cl.

CPC ......... *C21D 8/0226* (2013.01); *C21D 8/0263* (2013.01); *C22C 38/04* (2013.01); *C22C 38/22* (2013.01); *C22C 38/26* (2013.01); *C22C 38/34* (2013.01); *C23C 2/02* (2013.01); *C23C 2/0224* (2022.08); *C23C 2/024* (2022.08); *C23C 2/06* (2013.01); *C23C 2/28* (2013.01); *C23C 2/29* (2022.08); *C23C 2/40* (2013.01); *B23K 2103/04* (2018.08); *C21D 2211/001* (2013.01); *C21D 2211/002* (2013.01); *C21D 2211/005* (2013.01); *C21D 2211/008* (2013.01)

(58) Field of Classification Search

CPC ................ C21D 8/0263; C21D 8/0205; C21D 2211/008; C21D 2211/005; C21D 2211/002; C21D 2211/001

See application file for complete search history.

(56) References Cited

U.S. PATENT DOCUMENTS

| | | | | |
|---|---|---|---|---|
| 9,427,939 | B2 | 8/2016 | Allain et al. | |
| 2006/0144482 | A1 | 7/2006 | Moulin | |
| 2010/0104890 | A1 | 4/2010 | Satoh et al. | |
| 2011/0198002 | A1 | 8/2011 | Nakagaito et al. | |
| 2013/0087253 | A1 | 4/2013 | Matsuda et al. | |
| 2013/0167980 | A1* | 7/2013 | Kawata .................... | C21D 9/46 148/333 |
| 2014/0000765 | A1 | 1/2014 | Nozaki et al. | |
| 2014/0050941 | A1 | 2/2014 | Kawasaki et al. | |
| 2014/0103684 | A1 | 4/2014 | Takagi et al. | |
| 2014/0234660 | A1 | 8/2014 | Kawata et al. | |
| 2014/0360630 | A1 | 12/2014 | Arnold et al. | |
| 2014/0377582 | A1 | 12/2014 | Azuma et al. | |
| 2015/0059935 | A1 | 3/2015 | Hebesberger et al. | |
| 2015/0086808 | A1 | 3/2015 | Kasuya et al. | |
| 2015/0203947 | A1 | 7/2015 | Hasegawa et al. | |
| 2016/0177427 | A1 | 6/2016 | Takashima et al. | |
| 2016/0312326 | A1 | 10/2016 | Drillet et al. | |
| 2017/0096723 | A1 | 4/2017 | Kasuya et al. | |
| 2017/0306437 | A1* | 10/2017 | Nakagawa .............. | C22C 38/02 |
| 2018/0371566 | A1 | 12/2018 | Gospodinova et al. | |

FOREIGN PATENT DOCUMENTS

| | | | |
|---|---|---|---|
| EP | 2325346 | A1 | 5/2011 |
| EP | 2436794 | A1 | 4/2012 |
| EP | 2604715 | A1 | 6/2013 |
| EP | 2762589 | A1 | 8/2014 |
| EP | 2881481 | A1 | 6/2015 |
| JP | 5719545 | B2 | 5/2015 |
| JP | 2015193897 | A | 11/2015 |
| KR | 20090120720 | A | 11/2009 |
| RU | 2341566 | C2 | 12/2008 |
| RU | 2430185 | C2 | 9/2011 |
| WO | WO2012120020 | A1 | 9/2012 |
| WO | WO2012147898 | A1 | 11/2012 |
| WO | WO 2013047821 | A1 | 4/2013 |
| WO | WO 2013118679 | A1 | 8/2013 |
| WO | WO2015019557 | A1 | 2/2015 |
| WO | WO2015087224 | A1 | 6/2015 |

OTHER PUBLICATIONS

ASM Handbook, vol. 5: Surface Engineering C.M. Cotell, J.A. Sprague, and F.A> Smidt, Jr., editors, p. 339-348, DOI: 10.31399/asm.hb.v05.a0001270. 1994. (1994).

Corresponding International Search Report in connection with PCT/IB2015/059840 on Sep. 16, 2016.

Corresponding International Search Report in connection with PCT/EP2016/082195 on Feb. 13, 2016.

International Preliminary Report on Patentability in connection with PCT/EP2016/082195 on Feb. 19, 2018.

* cited by examiner

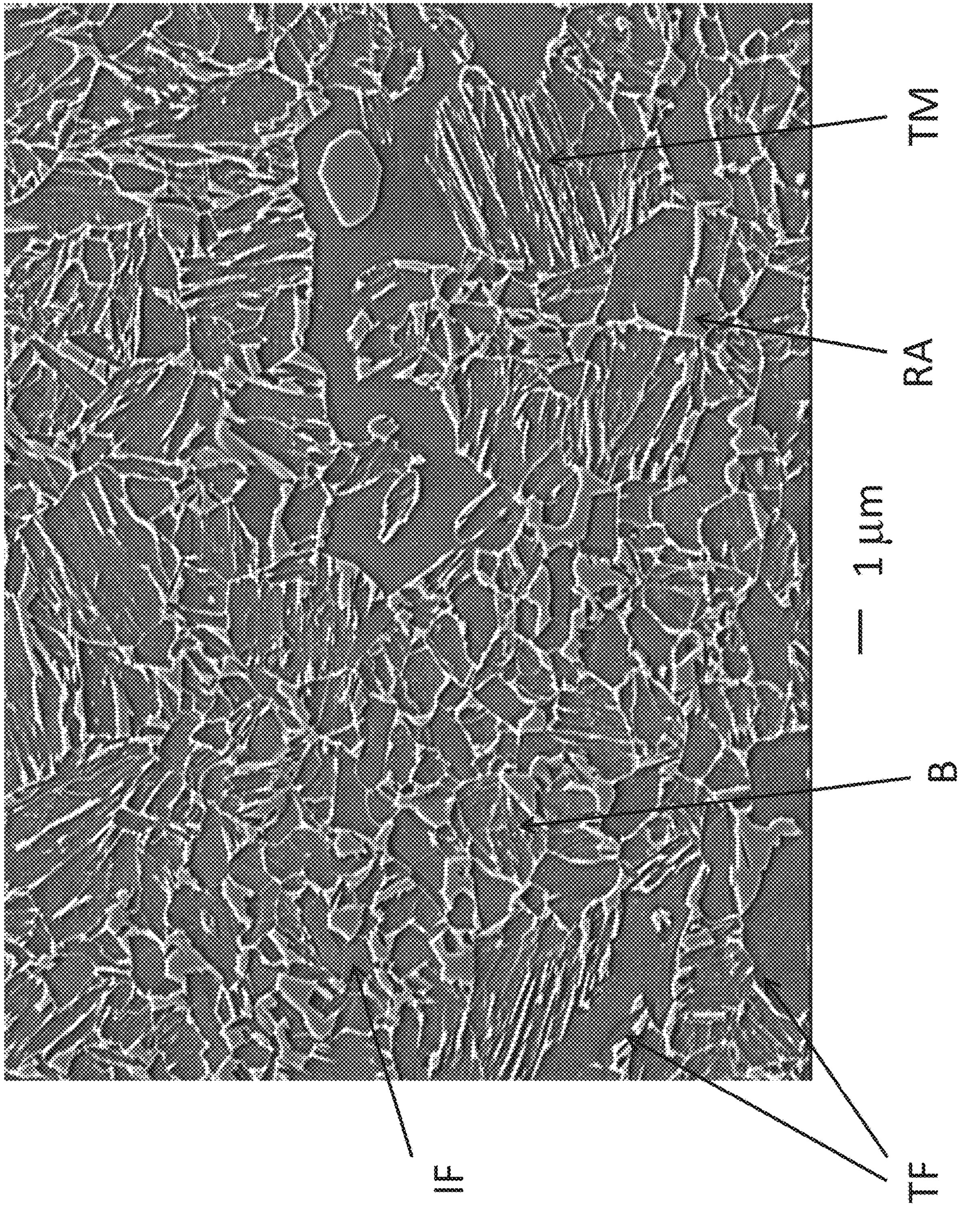
TM
RA
1 μm
B
IF
TF

METHOD FOR PRODUCING A HIGH STRENGTH COATED STEEL SHEET HAVING IMPROVED DUCTILITY AND FORMABILITY, AND OBTAINED COATED STEEL SHEET

TECHNICAL FIELD

The present disclosure relates to a method for producing a high strength coated steel sheet having improved ductility and formability and to a coated sheet obtained with this method.

BACKGROUND

To manufacture various equipments such as parts of body structural members and body panels for automotive vehicles, it is usual to use sheets made of DP (dual phase) steels or TRIP (Transformation Induced Plasticity) steels.

It is also known to use steels having a bainitic structure, free from carbides precipitates, with retained austenite, containing about 0.2% of C, about 2% of Mn, about 1.7% of Si, with a yield strength of about 750 MPa, a tensile strength of about 980 MPa, a total elongation of about 8%. These sheets are produced on continuous annealing lines by cooling from an annealing temperature higher than the $Ac_3$ transformation point, down to a holding temperature above the Ms transformation point and maintaining the sheet at the temperature for a given time. Some of these sheets are coated by metallic coating such as galvanization or galvannealing.

SUMMARY

To reduce the weight of the automotive in order to improve their fuel efficiency in view of the global environmental conservation, it is desirable to have sheets having improved yield and tensile strengths. But such sheets must also have a good ductility and a good formability and more specifically a good stretch flangeability.

In this respect, it is desirable to have coated steel sheets having a tensile strength TS of at least 1100 MPa, a total elongation TE of at least 12%, preferably of at least 13%, such that the product of the tensile strength and the total elongation is higher than or equal to 14200 MPa %, and a hole expansion ratio HER of at least 25% and preferably of at least 30%. The tensile strength TS and the total elongation TE are measured according to ISO standard ISO 6892-1, published in October 2009. It must be emphasized that, due to differences in the methods of measurement, in particular due to differences in the geometries of the specimen used, the values of the total elongation TE according to the ISO standard are very different and are in particular lower than the values of the total elongation according to the JIS Z 2201-05 standard. The hole expansion ratio HER is measured according to ISO standard 16630:2009. Due to differences in the methods of measurement, the values of hole expansion ration HER according to the ISO standard 16630:2009 are very different and not comparable to the values of the hole expansion ratio A according to the JFS T 1001 (Japan Iron and Steel Federation standard).

It is also desirable to have steel sheets having mechanical properties as mentioned above, in a thickness range from 0.7 to 3 mm, and more preferably in the range of 1 to 2 mm.

Therefore, one of the objects of the present disclosure is to provide a coated steel sheet with the mechanical properties mentioned above and a method to produce it.

The present disclosure provides a method for producing a coated steel sheet having a tensile strength TS of at least 1100 MPa, a total elongation TE according to ISO standard 6892-1 of at least 12%, the product TS×TE of the tensile strength by the total elongation being at least 14200 MPa %, and a hole expansion ratio HER according to ISO standard 16630:2009 of at least 25%, wherein the method comprises the following successive steps:

providing a cold-rolled steel sheet, the chemical composition of the steel containing in weight %:

$$0.15\% \le C \le 0.23\%,$$

$$2.0\% \le Mn \le 2.7\%,$$

$$\text{with } C + Mn/10 \ge 0.420\%,$$

$$0 \le Cr \le 0.40\%,$$

$$\text{with } Mn + Cr \ge 2.25\%,$$

$$0.2\% \le Si \le 1.6\%,$$

$$0.02\% \le Al \le 1.2\%,$$

$$\text{with } 1.0\% \le Si + Al \le 2.2\%,$$

$$0 \le Nb \le 0.035\%,$$

$$0 \le Mo \le 0.1\%,$$

the remainder being Fe and unavoidable impurities, annealing the steel sheet at an annealing temperature $T_A$ so as to obtain a structure comprising at least 65% of austenite and at most 35% of intercritical ferrite, quenching the sheet from a temperature of at least 600° C. at a cooling rate comprised between 20° C./s and 50° C./s down to a quenching temperature QT between 200° C. and 270° C., heating the sheet up to a partitioning temperature PT comprised between 400° C. and 480° C. and maintaining the sheet at this partitioning temperature PT for a partitioning time Pt comprised between 50 s and 250 s, hot-dip coating the sheet at a temperature less than 515° C., cooling the coated sheet down to the room temperature, the steel sheet having a microstructure consisting of, in surface fraction:

between 3% and 15% of retained austenite, at least 30% of tempered martensite, at most 5% of fresh martensite, at most 35% of bainite, the sum of the surface fractions of tempered martensite, fresh martensite and bainite being comprised between 55% and 92%, between 5% and 35% of ferrite.

In one embodiment, the method comprises, between the annealing step and the quenching step, a step of slow cooling the sheet at a cooling rate lower than 10° C./s for a time of at least 10 s down to a temperature higher than or equal to 600° C.

According to this embodiment, the ferrite preferably comprises, in area fraction with respect to the whole structure, between 0% and 5% of intercritical ferrite and between 0% and 35% of transformation ferrite, said transformation ferrite being formed during the slow cooling step.

In another embodiment, the ferrite consists of intercritical ferrite.

Preferably, the quenched sheet has, just before the heating to the partitioning temperature PT, a structure consisting of between 5% and 35% of ferrite, at least 3% of austenite, at least 30% of martensite, the complement consisting of lower bainite.

In one embodiment, the step of providing said cold-rolled steel sheet comprises:

hot rolling a sheet made of said steel to obtain a hot rolled steel sheet, coiling said hot-rolled steel sheet at a temperature Tc comprises between 400° C. and 650° C., performing a heat treatment at a temperature THBA comprised between 400° C. and 700° C., the sheet being maintained at said temperature THBA for a time between 120 s and 15 hours, cold rolling said hot-rolled steel sheet to obtain said cold-rolled steel sheet.

For example, the heat treatment is a batch annealing performed on the hot-rolled and coiled sheet, at a temperature THBA comprised between 550° C. and 700° C., the hot-rolled and coiled sheet being maintained at said temperature THBA for a time between 5 and 15 hours.

In another embodiment, the heat treatment is a continuous annealing, said temperature THBA being comprised between 600° C. and 700° C., the sheet being maintained at said temperature THBA for a time between 120 s and 360 s.

Preferably, after the sheet is quenched to the quenching temperature QT and before the sheet is heated to the partitioning temperature PT, the sheet is held at the quenching temperature QT for a holding time comprised between 2 s and 8 s, preferably between 3 s and 7 s.

Preferably, the chemical composition of the steel satisfies at least one of the following conditions: C≥0.17%, C≤0.21%, Mn≤2.5%, 0.010%≤Nb, Cr≤0.05%, or Cr≥0.10%.

In one embodiment, the chemical composition of the steel is such that C+Si/10≤0.30% and Al≥6(C+Mn/10)−2.5%.

According to this embodiment, the chemical composition of the steel is preferably such that 0.2%≤Si<1.0% and 0.4%≤Al≤1.2%, still preferably such that 0.2%≤Si≤0.8% and 0.7%≤Al≤1.2%.

In certain embodiments, the hot-dip coating step is a galvanizing step, or a galvannealing step with an alloying temperature GAT comprised between 480° C. and 515° C.

The steel sheet is for example coated with Zn or a Zn alloy.

The present disclosure also provides a process for producing a resistance spot weld of at least two steel sheets, said process comprising:

producing a first steel sheet by a method according to the present disclosure, such that C+Si/10≤0.30% and Al≥6 (C+Mn/10)−2.5%, the steel sheet being coated with Zn or a Zn alloy, providing a second steel sheet having a composition such that C+Si/10≤0.30% and Al≥6(C+Mn/10)−2.5%, resistance spot welding said first steel sheet to said second steel sheet.

The present disclosure also provides a coated steel sheet, wherein the chemical composition of the steel contains in weight %:

$$0.15\% \leq C \leq 0.23\%,$$

$$2.0\% \leq Mn \leq 2.7\%,$$

-continued $$\text{with } C + Mn/10 \geq 0.420\%,$$

$$0 \leq Cr \leq 0.40\%,$$

$$\text{with } Mn + Cr \geq 2.25\%,$$

$$0.2\% \leq Si \leq 1.6\%,$$

$$0.02\% \leq Al \leq 1.2\%,$$

$$\text{with } 1.0\% \leq Si + Al \leq 2.2\%,$$

$$0 \leq Nb \leq 0.035\%,$$

$$0 \leq Mo \leq 0.1\%,$$

the remainder being Fe and unavoidable impurities, said steel sheet having a microstructure consisting of, in surface percentage:

between 3% and 15% of retained austenite, at least 30% of tempered martensite, at most 5% of fresh martensite, at most 35% of bainite, the sum of the surface fractions of tempered martensite, fresh martensite and bainite being comprised between 55% and 92%, between 5% and 35% of ferrite.

In one embodiment, the ferrite comprises, in area fraction with respect to the whole structure, between 0% and 5% of intercritical ferrite and between 0% and 35% of transformation ferrite.

In another particular embodiment, the ferrite consists of intercritical ferrite.

Preferably, the C content in the retained austenite is comprised between 0.9% and 1.2%.

Preferably, the steel sheet has a yield strength of at least 500 MPa, a tensile strength of at least 1100 MPa, a total elongation according to ISO 6892-1 of at least 12%, the product TS×TE of the tensile strength by the total elongation being at least 14200 MPa %, and a hole expansion ratio HER according to ISO 16630:2009 of at least 25%.

Preferably, the chemical composition of the steel satisfies at least one of the following conditions:

$$C \geq 0.17\%,$$

$$C \leq 0.21\%,$$

$$Mn \leq 2.5\%,$$

$$0.010\% \leq Nb,$$

$$Cr \leq 0.05\%, \text{ or}$$

$$Cr \geq 0.10\%.$$

In one embodiment, the chemical composition of the steel is such that C+Si/10≤0.30% and Al≥6(C+Mn/10)−2.5%.

In this embodiment, the chemical composition of the steel is preferably such that 0.2%≤Si<1.0% and 0.4%≤Al≤1.2%, still preferably such that 0.2%≤Si≤0.8% and 0.7%≤Al≤1.2%.

The steel sheet is for example coated with Zn or a Zn alloy.

For example, the thickness of said coated steel sheet is comprised between 0.7 and 3 mm, preferably between 1 and 2 mm.

The present disclosure also provides a welded structure comprising at least ten resistance spot welds of at least two steel sheets, wherein a first steel sheet is according to the present disclosure, coated with Zn or a Zn alloy and such that C+Si/10≤0.30% and Al≥6(C+Mn/10)−2.5%, and a second steel sheet has a composition such that C+Si/10≤0.30% and Al≥6(C+Mn/10)−2.5%, and the mean number of cracks per resistance spot weld is less than 6.

Preferably, the second steel sheet is according to the present disclosure.

The present disclosure encompasses the use of a steel sheet manufactured according to the present disclosure, or of a steel sheet according to the present disclosure, for the manufacture of structural parts in motor vehicles.

The present disclosure also encompasses the use of a resistance spot weld produced by a process according to the present disclosure, or of a welded structure according to the present disclosure, for the manufacture of structural parts in motor vehicles.

The present disclosure will now be described in details but without introducing limitations, with reference to the appended FIGURE.

BRIEF DESCRIPTION OF THE DRAWINGS

FIG. 1 is a micrograph of the microstructure of a steel sheet.

DETAILED DESCRIPTION

The composition of the steel according to the present disclosure comprises, in weight percent:

- 0.15% to 0.23% of carbon for ensuring a satisfactory strength and improving the stability of the retained austenite which is necessary to obtain a sufficient elongation. Preferably, the carbon content is higher than or equal to 0.16%, still preferably higher than or equal to 0.17%, and/or lower than or equal to 0.21%. If the carbon content is too high, the hot rolled sheet is too hard to cold roll and the weldability is insufficient. If the carbon content is below 0.15%, the tensile strength will not reach 1100 MPa.
- 2.0% to 2.7% of manganese. If the manganese content is lower than 2.0%, the steel does not have a sufficient hardenability, so that a microstructure containing at least 55% of the sum of martensite and bainite, and a tensile strength of more than 1100 MPa are not obtained. The maximum manganese content is defined to avoid having segregation issues which are detrimental for the ductility. Preferably, the manganese content is lower than or equal to 2.5%.
- 0% to 0.40% of chromium. Cr may be added to increase the hardenability and to stabilize the retained austenite in order to strongly reduce austenite decomposition during partitioning. But more than 0.40% of chromium is detrimental for the flangeability and if Cr content is more than 0.40% it is not possible to obtain an HER ratio of more than 25%. According to an embodiment, the chromium can be not used and its content can remain less than 0.05%, a content of less than 0.05% corresponding to the presence of Cr as an impurity. When Cr is voluntarily added, its content is of at least 0.10%.

Furthermore, the carbon and manganese contents are such that (C+Mn/10)≥0.420% and the manganese and chromium contents are such that (Mn+Cr)≥2.25% in order to obtain a tensile strength of more than 1100 MPa and/or a total elongation according to ISO 6892-1 of at least 12%. If (C+Mn/10)<0.420 and/or (Mn+Cr)<2.25%, a tensile strength of more than 1100 MPa and/or a total elongation of at least 12% are not achieved.

- 0.2% to 1.6% of silicon and 0.02% to 1.2% of aluminum may be present, the sum of the silicon and aluminum contents being comprised between 1.0% and 2.2%.

A certain amount of aluminum is combined with oxygen as $Al_2O_3$, and with nitrogen as AlN; this amount depends on O and N contents and remains less than 0.025%. The remainder if it exists is not combined and consists in "free aluminum".

The aluminum which is combined with oxygen results from the deoxidation in the liquid stage. It is detrimental for to the ductility properties and therefore, its content has to be limited as much as possible.

The aluminum which is combined with nitrogen slows down the austenitic grains growth during annealing. Nitrogen is a residual element resulting from the smelting and is less than 0.010% in the steel sheet.

The inventors have found that Si and free Al stabilize the austenite by delaying the formation of carbides. This occurs in particular if the steel sheet is cooled at a temperature so as to obtain a partial martensitic transformation, and immediately reheated and maintained at a temperature PT during which the carbon is redistributed from martensite to austenite. If Si and free Al content additions are in sufficient amount, the carbon redistribution occurs without significant carbides precipitation. For this purpose Si+Al has to be more than 1.0% in weight (but less than 2.2%). Moreover, Si provides a solid solution strengthening and improves the hole expansion ratio. But the Si content has to be limited to 1.6% to avoid the formation of silicon oxides at the surface of the sheet which would be detrimental to the coatability.

Moreover, the inventors have found that when Si/10>0.30%−C (Si and C being expressed in weight percentage), due to the LME (liquid metal embrittlement phenomenon), silicon is detrimental to the resistance spot welding of coated sheets and particularly to galvanized or galvannealed or electrogalvanized sheets. LME occurrence causes cracks at the grain boundaries in the Heat Affected Zones and in the weld metal of welded joints. Therefore (C+Si/10) has to be maintained less than or equal to 0.30%, especially is the sheet is to be coated.

They have also found that to reduce the LME occurrence, for the domain of compositions which is considered, Al content has to be higher than or equal to 6(C+Mn/10)−2.5%.

Thus, according to a first embodiment, particularly when LME is not likely to appear, Al is added only to deoxidize or optionally to control the austenitic grains growth during annealing and its content remains less than 0.5%, for example less than 0.1%, but is preferably at least 0.020%. According to this first embodiment, the Si content is between 1.2% and 1.6%. In this embodiment, (C+Si/10) may be higher than 0.30%, or lower than or equal to 0.30%, depending on the C content.

According to a second embodiment, particularly when the problem of LME has to be considered, C and Si contents have to be such that (C+Si/10)≤0.30%. Thus, Al is added in more important quantities, in order to replace at least partly Si to stabilize austenite. In this second embodiment, the Al content is comprised between 0.4% and 1.2%, preferably between 0.7% and 1.2%, with Al≥6(C+Mn/10)−2.5%, and Si is comprised between 0.2% and 1.2%, preferably between 0.2% and 1.0%, still preferably between 0.2% and 0.8%. The Al content is limited to 1.2% in order to prevent the increase of the Ac3 transformation temperature, which would imply higher cost when heating at high temperature for obtaining austenitization of the steel sheet in the annealing step.

optionally from 0.010% to 0.035% of niobium may be present, in order to refine the austenite grains during hot-rolling and to provide precipitation strengthening. A Nb content of 0.010% to 0.035% makes it possible to obtain satisfactory yield strength and elongation, in particular a yield strength of at least 500 MPa.

Optionally up to 0.1% of molybdenum may be present.

The balance is iron and residual elements resulting from the steelmaking. In this respect, Ni, Cu, Ti, V, B, S, P and N at least are considered as residual elements which are unavoidable impurities. Therefore, their contents are less than 0.05% for Ni, 0.03% for Cu, 0.007% for V, 0.0010% for B, 0.003% for S, 0.02% for P and 0.007% for N. The Ti content is limited to 0.05% because above such values, large-sized carbonitrides would precipitate mainly in the liquid stage and the formability of the steel sheet would decrease, making the 12% target for the total elongation more difficult to reach, and the 25% target for the hole expansion ratio HER is difficult to reach.

When the sheets are coated with Zn or a Zn alloy, the hot spot weldability can be affected by the LME phenomenon (Liquid Metal Embrittlement).

The sensitivity of a particular steel to this phenomenon can be evaluated by tensile test performed at high temperature. In particular, this hot tensile test can be performed using a Gleeble RPI thermal simulator, such device being known per se in the art.

This test which is named "Gleeble LME test" is described as follows:

- samples of coated sheet having a thickness from 0.7 mm to 3 mm are submitted to high temperature tensile tests in order to determine which is the minimal critical displacement for which cracking around the welded zone occur. The samples which are cut in the sheet to be tested have a calibrated zone which is 10 mm long and 10 mm wide, and heads which are 40 mm long and 30 mm wide, the radius of curvature between the heads and the calibrated part being 5 mm.
- the high temperature tensile tests are performed by heating rapidly (1000° C./s) each sample, maintaining the sample at a predetermined temperature and submitting the heated sample to a predetermined elongation or displacement, then cooling down the sample in air, the elongation or displacement being maintained, the displacements being the displacements of the grids of the Gleeble RPI thermal simulator. After cooling, the samples are observed in order to determine if there is LME cracking or not. It is determined that the sample has a crack if at least one crack of at least 2 mm is formed on the sample.
- the tests are made at a plurality of predetermined temperatures, such as 700° C., 750° C., 800° C., 850° C., 900° C. and 950° C., and with elongations or displacements of 0.5 mm, 0.75 mm, 1 mm, 1.25 mm, 1.5 mm, 1.75 mm, 2 mm, and so on; the elongations or displacements are the elongations or displacements of the jaws maintaining the samples on the Gleeble simulator.
- the critical displacement for cracking onset is reported and the minimum critical displacement, i.e. the minimum displacement for which cracking occurs, is determined for the considered temperature range.

Usually, it is considered that when the minimum critical displacement is less than 1.5 mm at a temperature between 700° C. and 800° C., the probability of occurrence of LME in resistance spot welding is high, and when the minimum critical displacement is at least 1.5 mm, the probability to observe many LME cracks in resistance spot welding is low.

In this respect, the inventors have discovered that for steels corresponding to the present disclosure or similar to these steels, if the composition is such that (C+Si/10) is less than or equal to 0.30%, and Al is higher than or equal to 6(C+Mn/10)−2.5%, the minimum critical displacement is at least 1.5 mm. When (C+Si/10) is higher than 0.30% and/or and Al is lower than 6(C+Mn/10)−2.5%, the minimum critical displacement is less than 1.5 mm, and even less than 1 mm.

Another method for evaluating the spot weldability of the coated sheets is a "LME spot welding test" which allows determining the probability to have cracked welds in an important number of resistance spot welds, for example in an industrial production of products comprising parts which are assembled by resistance spot welding such as, for example, car bodies.

This "LME spot welding test" is derived from the electrode life test for resistance spot welding in which a plurality of resistance spot welds, for example 30, are performed on three sheets superposed together: the sheet to be tested and two support sheets made of galvanized low carbon sheets, for example DX54D+Z according to EN 10346. The thicknesses of the sheets are 1.6 mm and the resistance spot welds are made according to the ISO Standard 18278-2 for heterogeneous assemblies. The parameters are:

- electrode tip diameter: 8 mm,
- welding force: 4.5 kN,
- welding time: 3 pulses of 180 ms separated by 40 ms periods (cool times),
- holding time: 400 ms.

For this test, the eventual occurrence of cracks in the resistance spot welds, the samples are cut and polished. The resistance spot welds are then etched with picric acid, and observed by microscope, for example with a 200× magnification, in order to determine the number of cracks in each observed resistance spot weld and the sum of the length of the cracks of each resistance spot weld.

For examples having a composition such that (C+Si/10) ≤0.30% and (C+Si/10)>0.30%, respectively, the proportions of the numbers of cracks for each resistance spot weld are as follow:

- (C+Si/10)≤0.30%: Gleeble LME test>1.5 mm, at least 80% of the resistance spot welds have less than 10 cracks, and 0% have 20 or more cracks,
- (C+Si/10)>0.30%: Gleeble LME test<1.5 mm, only 40% of the resistance spot welds have less than 10 cracks, and 30% have 20 or more cracks.

If the mean number of cracks in each resistance spot weld is considered, the results are as follows:

- for compositions such that C+Si/10≤0.30%, the mean number of cracks in each resistance spot weld is less than 6,
- for compositions such that C+Si/10>0.30%, the mean number of cracks in each resistance spot weld is higher than 6.

Hot rolled sheet having a thickness between 2 and 5 mm can be produced in a known manner from the steel composition of the present disclosure mentioned above. As an example, the reheating temperature before rolling can be comprised between 1200° C. and 1280° C., preferably about 1250° C., the finish rolling temperature is preferably comprised between Ar3 and 950° C., and the coiling is performed at a temperature preferably comprised between 400° C. and 650° C. Preferably, if (C+Si/10)≤0.30%, the coiling temperature is comprised between 450° C. and 550° C.

After the coiling, the sheet has a ferrito-pearlitic or ferrito-pearlito-bainitic structure.

After the coiling, the sheet is optionally heat treated, for example batch annealed or continuously annealed in order to reduce the hardness of the steel sheet and therefore improve the cold-rollability of the hot-rolled and coiled steel sheet.

For example, the hot-rolled and coiled steel sheet is heat treated at a temperature between 400° C. and 700° C., and maintained at the batch annealing temperature THBA for a time between 120 s and 15 h.

According to an embodiment, the heat-treatment is a batch annealing performed on the hot-rolled and coiled sheet, at a temperature of batch annealing THBA comprised between 550° C. and 700° C., the hot-rolled and coiled sheet being maintained at the temperature THBA for a time between 5 and 15 hours.

According to another embodiment, the sheet is continuously annealed, the annealing temperature THBA being comprised between 600° C. and 700° C., and the sheet being maintained at said temperature THBA for a time between 120 s and 360 s.

The sheet can be pickled and cold rolled to obtain a cold rolled sheet having a thickness between 0.7 mm and 3 mm, for example in the range of 1 mm to 2 mm.

Then, the sheet is heat treated on a continuous annealing and coating line.

The heat treatment comprises the steps of:

annealing the sheet at an annealing temperature $T_A$ such that, at the end of the annealing step, the steel has a structure comprising at least 65% of austenite, and up to 100%, and from 0% to 35% of intercritical ferrite. One skilled in the art knows how to determine the annealing temperature $T_A$ from dilatometry tests, or from semi-empirical formulae. Preferably, the annealing temperature $T_A$ is of at most Ac3+20° C., in order to limit the coarsening of the austenitic grains, Ac3 designating the temperature of the end of the transformation into austenite during the heating step. Still preferably, the annealing temperature $T_A$ is of at most Ac3. The sheet is maintained at the annealing temperature i.e. maintained between $T_A$−5° C. and $T_A$+10° C., for an annealing time to preferably of more than 30 s, but which does not need to be of more than 300 s.

optionally slow cooling the sheet from the annealing temperature $T_A$ to a cooling stop temperature, at a cooling rate lower than 10° C./s, preferably lower than 5° C./s, so as to obtain a total ferrite fraction (intercritical ferrite+transformation ferrite) comprised between 5% to 35%, without forming pearlite and bainite. This slow cooling step aims at forming ferrite, in particular if the fraction of intercritical ferrite after the annealing step is lower than 5%. In that case, the fraction of ferrite formed during the slow cooling is higher than or equal to 5%-IF, IF being the fraction of intercritical ferrite, and lower than or equal to 35%-IF. If the fraction of intercritical ferrite is at least 5%, the slow cooling is optional. In any case, the fraction of ferrite formed during the slow cooling is lower than or equal to 35%-IF, so that the total ferrite fraction remains of at most 35%. The cooling stop temperature is comprised between 750° C. and 600° C. Indeed, a cooling stop temperature higher than 750° C. does not allow the formation of enough ferrite, whereas a cooling stop temperature lower than 600° C. may lead to the formation of bainite. The slow cooling is preferably performed during a cooling time comprised between 10 s and 40 s. The ferrite which may be formed during the slow cooling step, further called "transformation ferrite", is different from the intercritical ferrite which remains in the structure at the end of the annealing step. In particular, contrarily to the transformation ferrite, the intercritical ferrite is polygonal. Besides, the transformation ferrite is enriched in carbon and manganese, i.e. has carbon and manganese contents which are higher than the carbon and manganese contents of the intercritical ferrite. The intercritical ferrite and the transformation ferrite can therefore be differentiated by observing a micrograph with a FEG-TEM microscope using secondary electrons, after etching with sodium metabisulfite. On the micrograph, as shown on the appended FIGURE, the intercritical ferrite appears in medium grey, whereas the transformation ferrite appears in dark grey, owing to its higher carbon and manganese contents. On the FIGURE, IF designates the intercritical ferrite, TF designates the transformation ferrite, FM designates the fresh martensite and RA designates the retained austenite. For each particular composition of the steel, one skilled in the art knows how to determine precisely the slow cooling conditions suitable to obtain the desired transformation ferrite fraction. The formation of transformation ferrite allows controlling more accurately the area fraction of ferrite in the final structure, and thus provides robustness of the process.

just after the annealing or the slow cooling step, quenching the sheet by cooling down from a temperature of at least 600° C. to a quenching temperature QT lower than the Ms transformation point of the austenite remaining after annealing and slow cooling, at a cooling rate fast enough to form essentially martensite and lower bainite, whilst avoiding the formation of upper and granular bainite. The cooling rate is preferably comprised between 20° C./s and 100° C./s. For each particular composition of the steel and each structure, one skilled in the art knows how to determine the Ms transformation point of the austenite remaining after annealing and slow cooling. He also knows how to determine the quenching temperature adapted to obtain a desired structure, just after quenching, consisting of between 5% to 35% of the sum of intercritical ferrite and transformation ferrite, at least 3% of austenite and at least 30% of martensite, the complement, if any, consisting of lower bainite. Generally, the quenching temperature QT lies between 200° C. and 270° C. If the quenching temperature QT is lower than 200° C., the fraction of tempered (or partitioned) martensite in the final structure is too high to stabilize a sufficient amount of retained austenite above 3%, so that the total elongation measured according to ISO standard ISO 6892-1 does not reach 12%. Moreover, if the quenching temperature QT is higher than 270° C., the fraction of tempered martensite in the final structure is too low to obtain the desired tensile strength. Preferably, the quenching temperature QT is comprised between 200° C. and 250° C.

optionally holding the quenched sheet at the quenching temperature QT for a holding time comprised between 2 s and 8 s, preferably between 3 s and 7 s.

reheating the sheet from the quenching temperature up to a partitioning temperature PT comprised between 400° C. and 480° C., and preferably comprised between 440° C. and 470° C. The reheating rate can be high when the reheating is performed by induction heating, for example between 6 and 13° C./s. If the partitioning temperature PT is higher than 480° C. or lower than 400° C., the elongation of the final product is not satisfactory.

maintaining the sheet at the partitioning temperature PT for a partitioning time Pt comprised between 50 s and 250 s, preferably between 50 s and 200 s. During this partitioning step, the carbon is partitioned, i.e. diffuses from the martensite into the austenite, which is thus enriched.

hot dip coating the sheet. The hot dip coating can be, for example, galvanizing. When the sheet is galvanized, it is done with the usual conditions. The steel sheet according to the present disclosure can be galvannealed, at an alloying temperature GAT comprised between 480° C. and 515° C., for example comprised between 480° C. and 500° C., to alloy the Zn coating by inter-diffusion with Fe is performed after the steel is dipped in the Zn bath. If the galvannealing temperature is higher than 515° C., the total elongation according to ISO 6892-1 decreases to less than 12%. The steel according to the present disclosure can be galvanized Zn or with a Zn alloy like zinc-magnesium or zinc-magnesium-aluminum. But, all metallic hot dip coating is possible provided that the temperature at which the sheet is brought to during coating remain less than 501° C.

cooling the sheet to the room temperature, at a cooling speed preferably higher than 10° C./s, for example comprised between 10° C./s and 20° C./s.

This heat treatment allows obtaining a final structure i.e. after partitioning and cooling to the room temperature, consisting of:

retained austenite, with a surface fraction comprised between 3% and 15%, tempered martensite, with a surface fraction of at least 30%, fresh martensite, with a surface fraction of at most 5%, bainite, with a surface fraction of at most 35%; the bainite includes lower bainite, for example consists of lower bainite, the sum of the surface fractions of tempered martensite, fresh martensite and bainite being comprised between 55% and 92%, between 5% and 35% of ferrite. The ferrite includes, with respect to the whole structure, between 0% (included) and 35% of intercritical ferrite and between 0% (included) and 35% of transformation ferrite, such that the surface fraction of the sum of intercritical ferrite and transformation ferrite is comprised between 5% and 35%. For example, the ferrite consists of intercritical ferrite. According to another example, the ferrite comprises, with respect to the whole structure, from 0% to 5% of intercritical ferrite and from 0% (excluded) and 35% of transformation ferrite.

A fraction of retained austenite of at least 3%, together with a surface fraction of ferrite between 5% and 35%, allows obtaining a total elongation according to ISO 6892-1 of at least 12%.

Furthermore, this treatment allows obtaining an increased C content in the retained austenite, which is of at least 0.9%, preferably even of at least 1.0%, and up to 1.2%.

The martensite comprises fresh martensite, and tempered martensite.

The tempered martensite, which is partitioned martensite, has a C content of at most 0.45%, this content resulting from the partitioning of carbon from austenite to martensite during the partitioning step. The fresh martensite, which results from the transformation of enriched austenite to martensite after the partitioning step, has a C content which is of at least 0.9%, and generally at most 1.2%. The fraction of fresh martensite in the structure is lower than or equal to 5%. Indeed, a fraction of fresh martensite higher than 5% would lead to a hole expansion ratio HER according to ISO 16630:2009 lower than 25%.

With this heat-treatment, steel sheets having a yield strength YS of at least 500 MPa, a tensile strength TS of at least 1100 MPa, a total elongation TE according to ISO 6892-1 of at least 12%, and even higher than 13%, a product TS×TE of at least 14200 MPa %, and even higher than 16000 MPa %, and a hole expansion ratio HER according to the ISO standard 16630:2009 of at least 25%, and even at least 30%, can be obtained.

EXAMPLES

As examples and comparison, sheets made of steels compositions according to table I, have been manufactured, the elements being expressed in weight.

In this Table, "res." means that the element is only present as a residual, and that no voluntary addition of this element was made.

TABLE 1

| Steel | C % | Mn % | C + Mn/10 | Cr % | Mn + Cr | Si % | Al % | Si + Al % | Nb % | S % | C + Si/10 |
|---|---|---|---|---|---|---|---|---|---|---|---|
| 1 | 0.162 | 2.540 | 0.416 | res. | 2.540 | 0.965 | 0.995 | 2.0 | res. | 0.001 | 0.26 |
| 2 | 0.228 | 1.820 | 0.410 | 0.20 | 2.020 | 1.220 | 0.02 | 1.2 | res. | 0.001 | 0.35 |
| 3 | 0.221 | 2.050 | 0.426 | res. | 2.050 | 0.724 | 0.775 | 1.5 | 0.020 | 0.001 | 0.29 |
| 4 | 0.222 | 2.050 | 0.427 | 0.26 | 2.310 | 0.722 | 0.770 | 1.5 | 0.020 | 0.001 | 0.29 |
| 5 | 0.192 | 2.280 | 0.420 | res. | 2.280 | 1.460 | 0.02 | 1.5 | 0.019 | 0.001 | 0.34 |
| 6 | 0.218 | 2.040 | 0.422 | 0.27 | 2.310 | 0.723 | 0.764 | 1.5 | res. | 0.001 | 0.29 |
| 7 | 0.180 | 2.500 | 0.430 | res. | 2.500 | 1.200 | 0.600 | 1.8 | res. | 0.001 | 0.3 |
| 8 | 0.180 | 2.500 | 0.430 | res. | 2.500 | 1.200 | 0.600 | 1.8 | 0.02 | 0.001 | 0.3 |
| 9 | 0.218 | 2.082 | 0.426 | 0.350 | 2.432 | 1.491 | 0.02 | 1.511 | res. | 0.001 | 0.37 |

The sheets were hot-rolled, then coiled at 540° C. or 450° C. The sheets were pickled and cold rolled to obtain sheets having a thickness of 1.2 mm, annealed, quenched, partitioned, galvanized at 460° C. and cooled to the room temperature. No slow cooling was performed. Before pickling and cold rolling, some sheets were batch annealed.

The conditions of treatment are reported in Table II.

In this table, Tcoil is the coiling temperature, THBA is the batch annealing temperature, tHBA is the time of batch annealing, $T_A$ is the annealing temperature, $t_A$ is the annealing time, QT the quenching temperature, PT the partitioning temperature, Pt the partitioning time. The transformation temperatures such as Ac1 and Ac3 are also reported in table II. Ac1 and Ac3 were calculated using Thermocalc®.

The mechanical properties were measured in the transverse direction relative to the direction of rolling. As it is well known in the art, the ductility level is slightly better in the direction of rolling than in the transverse direction for such high strength steel.

Measured properties are the hole expansion ratio HER measured according to the standard ISO 16630:2009, the yield strength YS, the tensile stress TS, the uniform elongation UE and the total elongation TE. The yield strength YS, the tensile stress TS, the uniform elongation UE and the total elongation TE were measured according to the ISO standard ISO 6892-1, published in October 2009. The microstructures are reported in Table III and the mechanical properties are reported in Table IV.

TABLE II

| Example | Steel | Ac1 (° C.) | Ac3 (° C.) | Tcoil (° C.) | THBA (° C.) | tHBA (h) | $T_A$ (° C.) | $t_A$ (s) | QT (° C.) | PT (° C.) | Pt (s) |
|---|---|---|---|---|---|---|---|---|---|---|---|
| A | 1 | 720 | 995 | 540 | — | — | 850 | 114 | 250 | 460 | 100 |
| B | 2 | 727 | 820 | 540 | 550 | 10 | 850 | 100 | 250 | 460 | 60 |
| C | 3 | 721 | 905 | 540 | — | — | 850 | 60 | 250 | 460 | 100 |
| D | 4 | 725 | 900 | 540 | — | — | 850 | 60 | 250 | 460 | 100 |
| E | 5 | 722 | 830 | 540 | 550 | 10 | 850 | 60 | 250 | 460 | 100 |
| F | 6 | 725 | 900 | 540 | — | — | 880 | 120 | 270 | 460 | 60 |
| G | 7 | 720 | 895 | 450 | 550 | 10 | 850 | 100 | 250 | 460 | 60 |
| H | 7 | 720 | 895 | 450 | 550 | 10 | 850 | 100 | 230 | 460 | 60 |
| I | 8 | 720 | 895 | 450 | 550 | 10 | 850 | 100 | 230 | 460 | 60 |
| J | 8 | 720 | 895 | 450 | 550 | 10 | 870 | 100 | 230 | 460 | 60 |
| K | 8 | 720 | 598 | 450 | 550 | 10 | 850 | 100 | 230 | 460 | 200 |
| L | 9 | 728 | 825 | 540 | 550 | 15 | 820 | 100 | 250 | 460 | 60 |

In Table III, TM is the surface fraction of tempered martensite, FM is the surface fraction of fresh martensite, B is the surface fraction of bainite, IF is the surface fraction of intercritical ferrite, F is the total surface fraction of ferrite (intercritical ferrite+transformation ferrite)

TABLE III

| Example | Steel | TM (%) | FM (%) | B (%) | TM + FM + B (%) | IF (%) | F (%) | RA (%) |
|---|---|---|---|---|---|---|---|---|
| A | 1 | 23 | 17 | 0 | 40 | 53 | 58 | 2 |
| B | 2 | 47 | 0 | 38 | 85 | 0 | 5 | 10 |
| C | 3 | 37 | 2 | 14 | 53 | 30 | 36 | 11 |
| D | 4 | 32 | 4 | 20 | 56 | 29 | 34 | 10 |
| E | 5 | 53 | 0 | 33 | 86 | 0 | 5 | 9 |
| F | 6 | 44 | 3 | 27 | 74 | 11 | 16 | 10 |
| G | 7 | 58 | 0 | 0 | 58 | 26 | 31 | 11 |
| H | 7 | 47 | 0 | 15 | 62 | 26 | 31 | 7 |
| I | 8 | 52 | 0 | 10 | 62 | 26 | 31 | 7 |
| J | 8 | 47 | 0 | 30 | 77 | 14 | 19 | 4 |
| K | 8 | 51 | 0 | 15 | 66 | 26 | 31 | 3 |
| L | 9 | 58 | 0 | 20 | 78 | 5 | 10 | 12 |

These examples show that with a method according to the present disclosure, steel sheets having a tensile strength TS of at least 1100 MPa and a total elongation TE according to ISO 6892-1 of at least 12%, and even of at least 13% can be obtained, the product TS*TE being higher than 14200 MPa %. These steel sheets also have a yield strength of at least 500 MPa, a uniform elongation of at least 8%, and generally of more than 9%, and a hole expansion ratio HER according to ISO 16630:2009 of at least 25% and even often more than 30%.

Examples A and B show that when the C and Mn contents are such that C+Mn/10<0.420%, the desired structure is not obtained, and the tensile strength and/or the total elongation obtained is not satisfactory.

Example C shows that when Mn+Cr<2.25%, the sum of the martensite and bainite fractions is too low, so that a tensile strength of at least 1100 MPa is not obtained.

TABLE IV

| Example | Steel | YS (MPa) | TS (MPa) | UE (%) | TE (%) | TS × TE (MPa %) | HER (%) |
|---|---|---|---|---|---|---|---|
| A | 1 | 467 | 1065 | 12 | 16.2 | 17253 | 31 |
| B | 2 | 1172 | 1276 | 6.1 | 9.8 | 12505 | 67 |
| C | 3 | 662 | 998 | 16.5 | 20.7 | 20659 | 33 |
| D | 4 | 612 | 1110 | 13.9 | 17.8 | 19758 | 26 |
| E | 5 | 1071 | 1204 | 8.4 | 12 | 14207 | 33 |
| F | 6 | 1016 | 1136 | 8.6 | 13.6 | 15450 | nd |
| G | 7 | 523 | 1186 | 12.4 | 15.9 | 18857 | 39 |
| H | 7 | 735 | 1150 | 13.2 | 17.3 | 19895 | 36 |
| I | 8 | 588 | 1217 | 12.9 | 16.4 | 19959 | 31 |
| J | 8 | 1040 | 1175 | 12.1 | 16.5 | 19388 | 37 |
| K | 8 | 683 | 1191 | 11.8 | 15.3 | 18222 | 30 |
| L | 9 | 744 | 1249 | 11.1 | 14.7 | 18360 | 25 |

Regarding the spot weldability, the sheets according to the present disclosure have a low LME sensitivity when the composition is such that C+Si/10≤0.30% and Al≥6(C+Mn/10)−2.5%. It means that which such steels it is possible to produce structures comprising resistance spot welds, such as car bodies, for which the probability of the number of cracks in the resistance spot welds is such that the mean value is less than 6 cracks per resistance spot weld and the probability to have less than 10 cracks is 98%.

In particular, a welded structure, including resistance spot weld, of at least two steel sheets, can be produced by producing a first steel sheet by a method according to the present disclosure, the first sheet being such that C+Si/10≤0.30% and Al≥6(C+Mn/10)−2.5% and being coated with Zn or a Zn alloy, providing a second steel sheet having a composition such that C+Si/10≤0.30% and Al≥6(C+Mn/10)−2.5%, and resistance spot welding the first steel sheet to the second steel sheet. The second steel sheet may for example be produced by a method according to the present disclosure, and coated with Zn or a Zn alloy.

Thus, a welded structure having a low LME sensitivity is obtained. For example, for such a welded structure comprising at least ten resistance spot welds, the mean number of cracks per resistance spot weld is less than 6.

The steel sheets optionally welded by resistance spot welding according to the present disclosure are used with profit for the manufacture of structural parts in motor vehicles since they offer high formability during the fabrication process and high energy absorption in case of collision. The resistance spot welds according to the present disclosure are also used with profit for the manufacture of structural parts in motor vehicles, since eventual initiation and propagation of cracks located in the welded zones are much reduced.

What is claimed is:

1. A method for producing a coated steel sheet having a tensile strength TS of at least 1100 MPa, a total elongation TE according to ISO standard 6892-1:2009 of at least 12%, a product TS×TE of the tensile strength by the total elongation of at least 14200 MPa %, and a hole expansion ratio HER according to ISO standard 16630:2009 of at least 25%, the method comprising the following successive steps:

providing a cold-rolled steel sheet made of a steel having a chemical composition containing by weight:

$$0.15\% \le C \le 0.23\%,$$

$$2.0\% \le Mn \le 2.7\%,$$

$$\text{with } C + Mn/10 \ge 0.420\%,$$

$$0 \le Cr \le 0.40\%,$$

$$\text{with } Mn + Cr \ge 2.25\%,$$

$$0.2\% \le Si \le 1.6\%,$$

$$0.02\% \le Al \le 1.2\%,$$

$$\text{with } 1.0\% \le Si + Al \le 2.2\%,$$

$$0 \le Nb \le 0.035\%,$$

$$0 \le Mo \le 0.1\%, \text{ and}$$

a remainder, the remainder being Fe and unavoidable impurities;

annealing the steel sheet at an annealing temperature $T_A$ lower than Ac3 so as to obtain a structure comprising at least 65% of austenite and between 5% and 35% of intercritical ferrite;

quenching the steel sheet from the annealing temperature down to a quenching temperature QT between 200° C. and 270° C., with a cooling rate, from the annealing temperature down to the quenching temperature, of more than 20° C./s and up to 50° C./s;

heating the steel sheet up to a partitioning temperature PT comprised between 400° C. and 480° C. and maintaining the steel sheet at the partitioning temperature PT for a partitioning time Pt comprised between 50 s and 250 s;

hot-dip coating the steel sheet at a temperature less than 515° C.; and cooling the coated steel sheet down to room temperature;

the coated steel sheet having a microstructure consisting of, in surface fraction:

between 3% and 15% of retained austenite, at least 30% of tempered martensite, at most 5% of fresh martensite, at most 35% of bainite, a sum of the surface fractions of tempered martensite, fresh martensite and bainite being comprised between 55% and 92%, and between 5% and 35% of intercritical ferrite.

2. The method according to claim 1, wherein the steel sheet has, just before the heating to the partitioning temperature PT, a structure consisting of between 5% and 35% of ferrite, at least 3% of austenite, at least 30% of martensite, and a complement consisting of lower bainite.

3. The method according to claim 1, wherein the step of providing the cold-rolled steel sheet comprises:

hot rolling a sheet made of said steel to obtain a hot rolled steel sheet;

coiling said hot-rolled steel sheet at a temperature Tc comprises between 400° C. and 650° C., to obtain a hot-rolled and coiled steel sheet;

performing a heat treatment at a temperature THBA comprised between 400° C. and 700° C., the hot-rolled and coiled steel sheet being maintained at said temperature THBA for a time between 120 s and 15 hours; and cold rolling said hot-rolled steel sheet to obtain said cold-rolled steel sheet.

4. The method according to claim 3, wherein the heat treatment is a batch annealing performed on the hot-rolled and coiled steel sheet, the temperature THBA being comprised between 550° C. and 700° C., the hot-rolled and coiled sheet being maintained at said temperature THBA for a time between 5 and 15 hours.

5. The method according to claim 3, wherein the heat treatment is a continuous annealing, the temperature THBA being comprised between 600° C. and 700° C., the hot-rolled and coiled steel sheet being maintained at said temperature THBA for a time between 120 s and 360 s.

6. The method according to claim 1, wherein, after the steel sheet is quenched to the quenching temperature QT and before the steel sheet is heated to the partitioning temperature PT, the steel sheet is held at the quenching temperature QT for a holding time comprised between 2 s and 8 s.

7. The method according to claim 1, wherein the chemical composition of the steel satisfies at least one of the following conditions:

$$C \ge 0.17\%,$$

$$C \le 0.21\%,$$

$$Mn \le 2.5\%,$$

$$0.010\% \le Nb,$$

$$Cr \le 0.05\%, \text{ or}$$

$$Cr \ge 0.10\%.$$

8. The method according to claim 7, wherein the chemical composition of the steel is such that C+Si/10≤0.30% and Al≥6 (C+Mn/10)−2.5%.

9. The method according to claim 7, wherein the chemical composition of the steel is such that 0.2%≤Si<1.0% and 0.4%≤Al≤1.2%.

10. The method according to claim 9, wherein 0.2%≤Si≤0.8% and 0.7%≤Al≤1.2%.

11. The method according to claim 1, wherein the hot-dip coating step is a galvanizing step, or a galvannealing step with an alloying temperature GAT comprised between 480° C. and 515° C.

12. The method according to claim 1, wherein the steel sheet is coated with Zn or a Zn alloy.

13. The method according to claim 1, wherein the coated steel sheet has a yield strength of at least 500 MPa.

14. The method according to claim 1, wherein the coated steel sheet is cooled to the room temperature at a cooling speed higher than 10° C./s.

15. The method according to claim 1, wherein the coated steel sheet is cooled to the room temperature at a cooling speed comprised between 10° C./s and 20° C./s.

16. The method according to claim 1, wherein the annealing temperature $T_A$ is lower than or equal to Ac3−45° C.

17. The method according to claim 1, wherein the steel sheet is held at the annealing temperature for a time comprised between 30 s and 300 s.

18. The method according to claim 1, wherein the steel sheet is heated from the quenching temperature QT up to the partitioning temperature PT at a heating rate comprised between 6 and 13° C./s.

19. The method according to claim 1, wherein the hot dip coating is a galvanizing or a galvannealing.

20. The method according to claim 1, wherein the cooling rate, from the annealing temperature down to the quenching temperature, is of more than 30° C./s and up to 50° C./s.

21. The method according to claim 1, wherein the steel sheet is held at a constant partitioning temperature for the partitioning time Pt.

* * * * *